United States Patent [19]

Buchan et al.

[11] 3,993,825

[45] Nov. 23, 1976

[54] ELECTROPHOTOGRAPHIC TONER TRANSFER AND FUSING APPARATUS AND METHOD

[75] Inventors: William R. Buchan, Lincoln, Mass.; Robert A. Moore, Amherst, N.H.

[73] Assignee: Itek Corporation, Lexington, Mass.

[22] Filed: Feb. 20, 1975

[21] Appl. No.: 551,460

Related U.S. Application Data

[60] Division of Ser. No. 403,696, Oct. 4, 1973, Pat. No. 3,893,761, which is a continuation-in-part of Ser. No. 303,168, Nov. 2, 1972, abandoned.

[52] U.S. Cl. .......... 428/216; 118/644; 428/334; 428/337; 428/409; 428/421; 428/458; 428/447; 428/450; 428/474; 428/913; 96/1.4

[51] Int. Cl.$^{2}$ .......... B32B 7/02; B32B 27/00; B32B 9/04; B05B 5/02

[58] Field of Search .......... 428/216, 334, 335, 336, 428/337, 409, 421, 458, 474, 913, 447, 450, 451

[56] References Cited

UNITED STATES PATENTS

| | | | |
|---|---|---|---|
| 3,374,769 | 3/1968 | Carlson | 118/637 |
| 3,454,445 | 7/1969 | Durst et al. | 428/458 |
| 3,539,161 | 11/1970 | Byrne | 432/228 |
| 3,582,458 | 6/1971 | Haller | 428/458 |
| 3,640,249 | 2/1972 | Young | 427/24 |
| 3,669,706 | 6/1972 | Sanders et al. | 427/56 |
| 3,717,543 | 2/1973 | Sinclair et al. | 428/474 |
| 3,718,528 | 2/1973 | Bergstrom | 428/458 |
| 3,770,566 | 11/1973 | Gerow et al. | 428/337 |
| 3,791,909 | 2/1974 | McKee | 428/421 |
| 3,799,832 | 3/1974 | Reick | 428/421 |

*Primary Examiner*—George F. Lesmes
*Assistant Examiner*—William R. Dixon, Jr.
*Attorney, Agent, or Firm*—Homer O. Blair; Robert L. Nathans; David E. Brook

[57] ABSTRACT

Apparatus and method for transferring non-fused xerographic toner images from a first support material, such as a photoconductive insulating surface, to a second support material, such as paper, and fusing the toner images to the second support material. Such apparatus includes an intermediate transfer member having a smooth surface of low surface free energy and a hardness of from 3 to 70 durometers. The intermediate transfer member can be, for example, a 0.1–10 mil layer of silicone rubber coated onto a polyimide support. The member can be formed into belt or drum configuration.

7 Claims, 12 Drawing Figures

ELECTROPHOTOGRAPHIC TONER TRANSFER AND FUSING APPARATUS AND METHOD

CROSS REFERENCE TO RELATED APPLICATIONS

This is a division, of application Ser. No. 403,696, filed Oct. 4, 1973 now U.S. Pat. No. 3,893,761, which in turn is a continuation-in-part of Buchan et al., Ser. No. 303,168, filed Nov. 2, 1972 now abandoned.

BACKGROUND OF THE INVENTION

1. Field of the Invention

This invention relates to electrophotographic transfer-fusing apparatus and more particularly to an improved electrophotographic toner transfer-fusing apparatus of the thermomechanical type.

2. Description of the Prior Art

In customary electrophotographic processes, a conductive backing having a photoconductive insulating layer thereon is electrostatically imaged by first uniformly charging its surface, and subsequently exposing the charged surface to a pattern of activating electromagnetic radiation, such as light. The radiation pattern selectively dissipates electrostatic charges in the illuminated areas on the photoconductive surface, which results in a latent electrostatic image in non-illuminated areas. This latent electrostatic image can be subsequently developed to form a visible image by depositing developer materials thereon by a variety of development techniques, the most common of which is cascade development.

Solid electrophotographic developer materials are often two-component systems containing finely divided pigmented particles, commonly called "toner," and relatively coarser, larger beads, commonly called "carrier beads." Toner particles and carrier beads are chosen or modified to make them triboelectrically dissimilar, so that triboelectric charges are generated upon each as they are transported through the development apparatus. Additionally, the components are chosen so that the toner will have triboelectric charges thereon opposite in sign to the electrostatic charge pattern to be developed. Thus, toner particles adhere to the carrier particles because of their electrostatic charges and because of van der Waals forces, until they are shaken loose during development and captured by the opposite and stronger electrostatic charges on the insulating surface to be developed.

Developed toner images can be fused to the photoconductive insulating surface, or transferred and fused to another substrate such as plain paper. Transfer of the toner image can be accomplished by electrostatic methods, by the use of adhesive-coated paper, by pressure contact, etc. Once transferred, the toner image can be fused or fixed to the paper by heating and cooling, solvent vapor fusing, applying a fixative coating over the image, etc. The general state of the art in transfer and fusing methods and apparatus is described in more detail in Schaffert, *Electrophotography*, Focal Press, New York, (1965) at pages 24–25 and 39–40; and in the following U.S. patents: Lorenz, U.S. Pat No. 3,640,749; Welkel, U.S. Pat. No. 3,647,292; Colt et al., U.S. Pat. No. 3,647,499; Young, U.S. Pat. No. 3,640,249; Eastman, U.S. Pat. 3,630,691; Tyler, U.S. Pat. No. 3,612,685; Langdon, U.S. Pat. No. 3,612,677; Vince, U.S. Pat. No. 3,584,195; Schluntz, U.S. Pat. 3,558,853; White et al., U.S. Pat. No. 3,567,484; Fantuzzo, U.S. Pat. No. 3,566,076; and Byrne, U.S. Pat. No. 3,539,161.

In some cases, toner images have been transferred to intermediate belts prior to fusing on copy paper. Carlson, U.S. Pat. No. 2,990,278, for example, teaches the use of an intermediate transfer belt which has a smooth surface and which does not form a mechanical bond with toner. Carlson, U.S. Pat. No. 3,374,769 teaches the use of a transparent intermediate belt with a reflecting surface on the side of the belt opposite to a radiant heater. The transfer and fusing system described herein, while using an intermediate belt in some embodiments, has significant advantages over these prior art systems including: use of the belt as part of the paper transport system; use of the copy medium to cool the belt after each transfer; use of short, hot, selective heating zones; each of which features is described in considerably more detail infra.

One of the more recent efforts to improve pressure transfer and fusing techniques is described in Byrne, U.S. Pat. No. 3,591,276. In the method described therein, a developed xerographic powder image is transferred from a photoconductive surface to a final support material such as paper by contacting the toner image on the photoconductor with an elastomeric material under pressure to encapture the toner image due to the deformation of the elastomeric member. Subsequently, the toner image is transferred from the elastomeric member onto paper, either preheated or heated simultaneously by bringing the paper into pressure contact with the elastomeric member. Sufficient heat is supplied to the paper prior to or during pressure contact to cause the toner particles to melt and coalesce onto the paper.

While the techniques described by Byrne have improved pressure transfer and fusing, significant problems still remain. For example, since the paper is required to be significantly heated prior to or during transfer, high amounts of power are required especially since the paper normally contains moisture which must be driven off. Thus, high amounts of heat have to be supplied because of the use of an inefficient method of heating the toner. This results in a corresponding loss of economy and also causes certain other undesirable limitations for copy processes. Additionally, there can be a loss in the quality of fusing obtainable because of certain inherent limitations on the combination of heat and pressure which can be applied when preheated paper is depended upon to heat the toner to its melting point. In general, these inherent limitation arise because the paper can be heated only so high and because steep pressure pulses are not used at the transfer point.

Another recent effort to improve pressure transfer and fusing techniques is described in Sanders et al., U.S. Pat. No. 3,669,706. The fusing device described therein has a radiant energy transmissive rotatable drum covered by a radiant energy transmissive resiliently compressible layer and a thin flexible radiant energy absorbing outer skin. A major drawback to this system is its inefficient thermal design. For examle, the compressible layers are purposely designed to absorb large amounts of heat since the inner layer is relatively thick and since the outer layer is radiation absorbing. Also, thermal inefficiency occurs since a drum substrate is required between the heat source and toner, and because heat is applied to the bottom side of the toner. Since the drum heats up, the concomitant disadvantage of lessening the life of the photoconductor is also present. Higher pressure at the transfer point is also required, since heat passes from the drum surface to the toner by conductive heating rather than radiation heating; thick layers make it difficult, however, to achieve a pressure pulse with a fast rise time. Additionally, since the elastomer is relatively thick, dimensional distortion of the image is increased.

It is desirable, therefore, to have toner transfer and fusing methods and apparatus which can take advantage of the improvements offered by Byrne and Sanders et al. while not suffering from their inherent disadvantages.

SUMMARY OF THE INVENTION

The preferred embodiment of this invention may be referred to as a xerographic heat and pressure transfer and fusing apparatus. It includes an intermediate transfer member which has a smooth surface, a surface free energy below 40 dynes per centimeter, and a hardness from 3 to 70 durometers.

Means are provided for transferring a toner image from a first support material onto the surface of the intermediate transfer member. The toner image on the intermediate transfer member is then heated, preferably selectively, to a temperature at which it will flow when a sufficient force is applied thereto. Selective heating can be accomplished by means of a radiant heater and the proper choice of an intermediate material. A second support material, supplied for example on rolls, is then brought into pressure contact with the heated toner on the intermediate transfer member. Preferably, a pressure applying element is positioned immediately after the radiant heating zone to apply a pressure pulse with a steep rise time. Preheating toner and the use of intermediate transfer members as described herein results in excellent toner transfer and fusing, especially when the toner is selectively heated and the force is applied in such a manner that the resulting pressure pulse has a steep rise time.

This new transfer and fusing apparatus has many advantages over those of the prior art. For example, higher reslution in the final copy can be attained with this transfer-fusing apparatus than with most others. This is important because new xerographic techniques have been recently developed which allow the formation of higher resolution toner images, but these images must be transferred and fused without significant losses in resolution or the improvement is lost. Electrostatic transfer methods appear to be limited in the resolution which can be obtained.

Additionally, paper handling, typically a serious problem in electrophotographic copiers, is simplified. This results partly because the necessity of handling paper carrying non-fused toner images, which is characteristic of many prior art techniques, has been eliminated. Additionally, the necessity to electrostatically tack copy paper to a photoconductive surface is eliminated, thereby obviating the troublesome problem of having sheets of paper stick together even after they exit from the machine because of residual charges thereon.

Also, because the toner image is transferred mechanically, a variety of substrates can be used. These include both conductive and non-conductive substrates. Since the second support material is merely passed between two pressure rollers, substrates can be used which are not flexible, and even delicate materials can be used by creating very gentle transfer conditions.

Another advantage to the transfer and fusing apparatus described herein is that the second support material, typically paper, carries heat out of the machine. In this regard, the paper acts as a heat sink so that heat can be transferred from the hot toner and intermediate member to the paper which then exits from the machine. Because of this, parts of the copy machine tend to heat up to a much lesser degree.

In addition to the above advantages over previously known state of the art toner transfer and fusing apparatus, the apparatus described herein has several significant advantages over the elastomeric systems described in the Byrne U.S. Pat. No. 3,591,276 and Sanders et al. U.S. Pat. No. 3,669,706 patents. Thus, considerably less power is required because of the overall increase in thermal efficiency which is achieved due to selective preheating of the toner, designing the transfer member to have a low heat capacity, etc. Additionally, the transfer from the first support material to the intermediate transfer member can be controlled by adjusting the pressure applied and the transfer member used so that virtually any portion of the original toner image can be transferred from the photoconductor to the intermediate member. This is an important advantage not only because less toner is used for each copy, but because image preservation, i.e., the ability to make multiple copies from one electrostatic latent image, becomes possible when less than the entire toner image is transferred. An electrostatic latent image on the first support material, typically a photoconductive insulating material, can be continually toned and transferred in part to the intermediate transfer member from where it can be essentially totally transferred and fused to a second support material, such as paper. Image preservation results in greater copying efficiency, faster producton of copies, and tends to wear the photoconductor less.

Further, since Byrne preheates or simultaneously heats copy paper to temperatures above the toner melting point, the paper cannot act as a heat sink to cool the transfer member. Thus, the transfer member has a tendency to heat up which can interfere with toner transfer from the photoconductive surface and might even result in thermal damage to the delicate photoconductor.

DESCRIPTION OF PREFERRED EMBODIMENTS OF THE INVENTION

Figure 1:
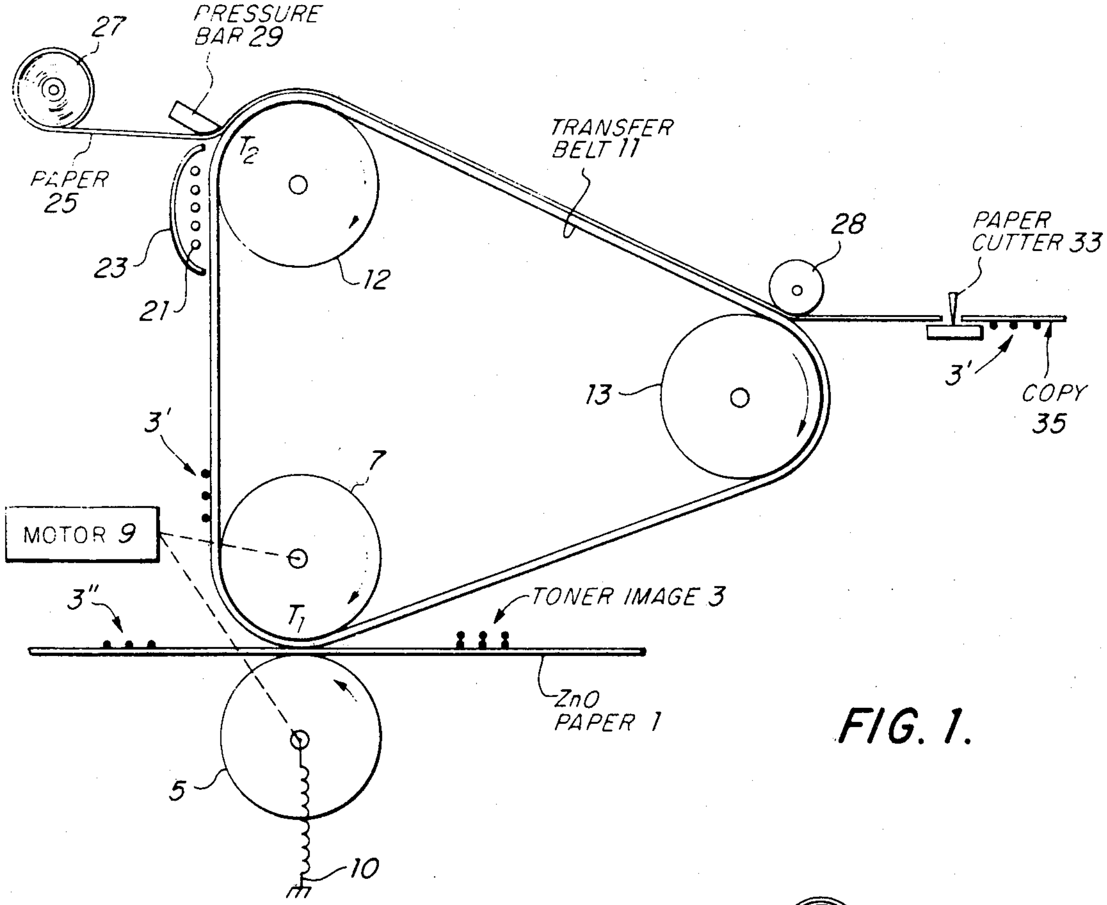
FIG. 1 is a schematic illustration of a transfer-fusing apparatus of this invention employing an intermediate transfer belt.

Referring now to the Figures in more detail, FIG. 1 illustrates in schematic form a transfer-fusing apparatus of this invention. A photoconductive insulating sheet, such as zinc oxide paper 1, with a developed but non-fused toner image 3 thereon, passes between rollers 5 and 7 which are caused to rotate with the same speed by motor 9. Toner image 3 is shown, for the purposes of illustration, as consisting of two layers of toner particles, though in fact there are usually more. The pressure between rollers 5 and 7 can be adjusted by spring means 10.

An intermediate transfer belt 11 is trained to pass over rollers 7, 12 and 13 in an endless loop. Belt 11 can be formed, for example, from a polyimide film substrate coated with 0.1–10 mils of silicone rubber or a fluoroelastomer which provides a transfer member having a smooth, low surface free energy surface and a hardness between 3 and 70 durometers. The details of suitable transfer members are described in greater detail infra.

As zinc oxide sheet 1 carrying toner image 3 passes through the nip between rollers 5 and 7, part of toner image 3 is transferred to the surface of belt 11 as illustrated by the single layer of toner image 3'. This transfer is referred to as $T_1$. By merely adjusting the pressure between rollers 5 and 7, and selecting a transfer member having the desired properties within the operable range, the amount of toner transferred at $T_1$ to the intermediate member can be controlled. By adjusting the various parameters including pressure, the electrostatic latent image, and the surface characteristics and thickness of the transfer material, it is believed that the range of toner transferred can be reasonably controlled from about 20% toner transfer to about 80% toner transfer. As a first approximation, the softer transfer materials and higher pressures tend to result in higher amounts of toner transfer at $T_1$, and vice versa.

As can be seen, part of toner image 3 is not transferred from zinc oxide sheet 1 and remains thereon as non-transferred toner image 3''. Toner image 3'' can be redeveloped if an image preservation mode is desired, can be cleaned so that sheet 1 is reusable, or can simply be thrown away with sheet 1. Partially transferred toner image 3' passes next to a radiant heating zone formed by radiant heating elements 21 which are encompassed by a reflector 23. Radiant heating tends to selectively heat the toner. For maximum selective heating, it is of course desirable to use a belt 11 with a low heat absorption compared to that of toner image 3'. This is usually easily accomplished since commonly used toners are pigmented black, and since it is easy to obtain belt material which is colorless and transparent or pigmented white.

The radiant heating zone is short and hot. Its length should be sufficient to provide a point on the transfer member with heating for about ⅛ to ⅓ seconds, and it should be hot enough to provide at least about 40 watts/square inch at a belt speed of 7½ inches per second. The shorter, more compact, higher temperture heaters lose less energy than longer heaters thereby making them more efficient.

A second support material, such as paper 25, is supplied from a feed roll 27. Paper 25 is brought into pressure contact with intermediate belt 11 by pressure bar 29 at a point closely adjacent to where partial toner image 3' exits from the radiant heating zone. This is to avoid any unnecessary radiation from the image to the surrounding atmosphere prior to transfer and fusing.

Pressure bar 29 has a beveled front edge leading to a flat trailing edge to guide paper 25 into a narrow point of contact, $T_2$, which is where toner is transferred from intermediate belt 11 to paper 25. The width of the flat trailing edge of pressure applying bar 29 is kept narrow so that the pressure pulse at $T_2$ has a steep rise time. It has been found that the application of pressure in this manner tends to drive heated toner into the cold paper before the toner has a chance to cool below its solidification point. Thus, a mechanical bond between paper and toner can be formed even before the toner solidifies in the paper. This combination of pressure pulse and preheating of the toner has been found to provide excellent transfer and fusing of toner images.

After transfer and fusing has taken place at $T_2$, paper 25 is held in contact with intermediate belt 11 and directed around guide roller 28 to a paper cutter 33 which cuts the roll paper to copy length. Paper 25 and belt 11 are allowed to remain in contact for a period after $T_2$ but prior to cutter 33 so that heat can be transferred from belt 11 to paper 25 and subsequently out of the machine. This extended cooling zone is a feature of the transfer-fusing apparatus described herein, because it turns the previously penalizing high heat capacity of paper to a useful purpose. Normally, the paper and belt should remain in contact for at least about 0.5 seconds or more for adequate cooling. The extended cooling zone also makes it possible to use the transfer belt as part of the paper transport system.

A completed electrophotographic copy 35, having a plain paper substrate 25 and an integrally fused toner image 3' thereon exits from the copy machine carrying most of the heat supplied to the toner and belt with it. Because of this, intermediate belt 11 returns around roller 13 to roller 7 for the next transfer of a developed xerographic image in a substantially cooled state.

Figure 2:
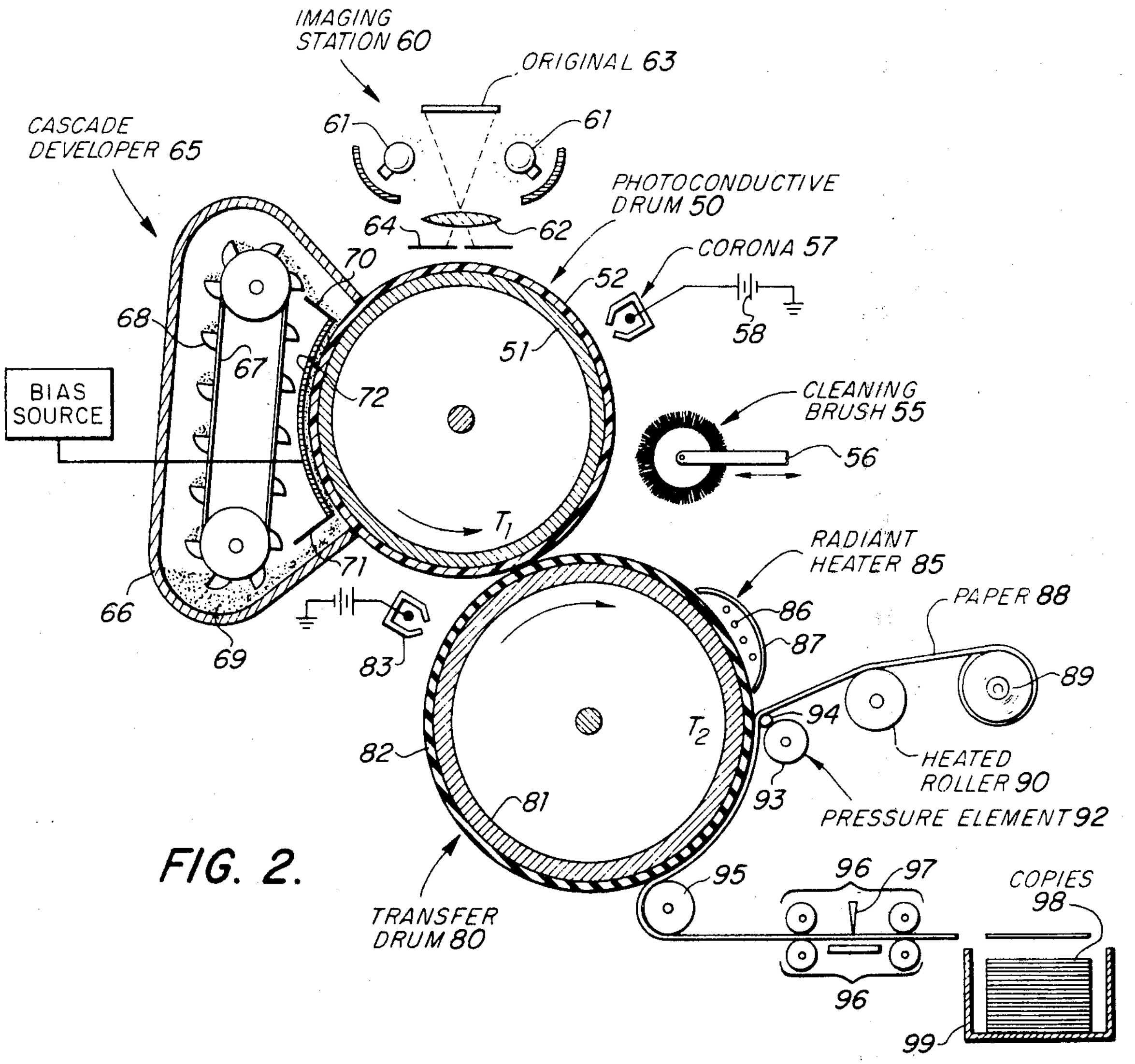
FIG. 2 is a schematic illustration of a transfer-fusing apparatus of this invention employing an intermediate transfer drum.

Referring now to FIG. 2, a copying machine is schematically illustrated wherein an intermediate transfer drum is used and wherein the apparatus is designed to operate in an image preservation mode, i.e., to produce multiple copies from a single imaging of the photoconductive drum 50. Typically, the photoconductive drum will consist of a conductive metal substrate 51, such as aluminum, coated on its outer surface with a layer of photoconductive insulating material 52, typically vitreous selenium. Drum 50 rotates about its axis and is shown rotating in a counterclockwise or "downhill" direction. Cleaning brush 55, which is mounted on slidable element 56 so that it can be disengaged, removes residual toner from the surface of drum 50 as desired.

A uniform electrostatic charge is formed on the surface of drum 50 by means of corona charging unit 57 which is electrically connected to a power source such as battery 58 and to ground. Uniformly electrostatically charged drum 50 then passes an imaging station 60 consisting of light sources 61, imaging lens 62 and slit 64, which serve to image original 63 onto the surface of drum 50.

Development of the electrostatic latent image thus produced is effected by cascade development apparatus 65. Typically, cascade development apparatus 65 will include a housing 66 including within it a bucket elevator system formed by an endless belt 67 having buckets 68 thereon. Electrostatic developer is lifted from a reservoir section 69 in buckets 68 to a point at the upper portion of drum 50 and is cascaded over the drum surface by means of feed guide 70. As developer cascades over drum 50, toner particles separate from the carrier beads and deposit on the drum surface in accordance with the latent electrostatic image thereon, thus forming a visible toner image. Spent developer is guided back into reservoir 69 by guide 71. A biased development electrode 72 is shown closely spaced to the drum surface to improve solid area coverage.

Other means of forming electrostatic latent images on insulating surfaces are known in the art and may be used instead of the ones specifically illustrated. More specific details on suitable photoconductive elements, charging means, exposing means, and developing means can be found in the following U.S. patents, the teachings of which are hereby incorporated by reference U.S. Pat. Nos.: 3,277,957; 3,312,548; 3,552,848; 3,566,108; 3,598,991; 3,612,864; 3,615,128; 3,628,786; 3,611,992; 2,832,311. In many prior art copying machines, the developed electrostatic image is transferred directly from the photoconductive surface to the final copy medium, which is usually paper. Typical prior art transfer systems are illustrated in U.S. Pat. Nos. 3,584,195; 3,642,362 and 3,647,292.

In accordance with this invention, however, an intermediate transfer drum 80 is used to remove a toner image from the surface of drum 50 and to transfer and fuse the toner image onto a final copy medium. Intermediate transfer drum 80 can be formed from a drum support material 81, such as aluminum, covered with a transfer material 82 having the transfer properties required as described below. Corona charge unit 83 is used to neutralize any residual electrostatic charges on the surface of drum 80 prior to each transfer at $T_1$. Additionally, drum 80 is preferably connected to ground. Drum 80 is rotated in a clockwise manner and is positioned so that the surface of transfer material 82 comes into pressure contact with the surface of drum 50 at $T_1$. As the toner image on the surface of drum 50 contacts the surface of transfer material 82, a portion of the toner image is transferred onto the surface of transfer material 82. As explained above, the amount of the toner image on the surface of drum 50 which is transferred at this point can be controlled by adjusting the pressure between the drum surfaces and by choosing a transfer material 82 having the properties required to do the desired transferring.

After a toner image has been transferred to the surface of drum 80, it passed by a radiant heater 85 consisting of heating elements 86 and reflector 87 which preferentially and selectively heat the toner image on the surface of transfer material 82 to a temperature above its melting point.

A second support material, such as paper 88 is supplied from paper roll 89 and is directed by guide roller 90 to pressure applying assembly 92. Guide roller 90 is also a heated roller which serves to preheat paper 88. Paper 88 is preheated only to a temperature, however, substantially below the toner melting point. In this way, the heat transfer rate from toner to paper can be reduced, thereby providing more time for transfer before the toner starts to cool below its melting point. Assembly 92 consists of a larger back up roller 93 and a smaller pressure roller 94, both of which are mounted off-axis to compensate for the forces applied to them by the rotation of drum 80. Small pressure roller 94 applies a pressure pulse at the point of contact, $T_2$, having a fast rise time.

After transfer and fusing at $T_2$, paper 88 is directed along intermediate transfer drum 80 by guide roller 95, whereby heat is transferred to the paper, and then to drive rollers 96 which direct the paper through cutter 97 which cuts the roll paper to copy length and deposits the copies 98 in a suitable collection tray 99.

As mentioned above, the copying machine illustrated in FIG. 2 is designed to use image preservation, i.e., produce multiple copies from one optical imaging of the photoconductive drum. In this mode, cleaning brush 55 is initially used to clean the surface of the drum 50 and is then slidably disengaged from the drum surface as shown. Corona 57 applies a uniform electrostatic charge and an original 63 is imaged onto the surface of drum 50 by imaging station 60 after which the latent electrostatic image is developed by cascade developer 65. The developed image on drum 50 consists of multiple layers of toner. The pressure between the surface of drum 50 and transfer drum 80 is adjusted so that less than the whole amount of this toner image is transferred at $T_1$. Good results in an image preservation mode have been obtained for example, when an amount of from about 30% to about 50% of the total toner image on the surface of drum 50 is transferred at $T_1$. The toner image that is transferred to drum 80 is selectively heated by heater 85 and transferred onto the paper as shown. The remaining toner image on drum 50, which still persists in imagewise fashion, passes by disengaged cleaning brush 55, and by corona station 57 and imaging station 60 which are not operated. Upon passing by cascade developer 65, the depleted toner image is rejuvenated to a full toner image and is ready for another partial transfer to drum 80. By carefully choosing the conditions at $T_1$ and $T_2$, a number of copies can be produced successfully from one optical imaging. This has many advantages which have been recognized by the art.

Figure 3:
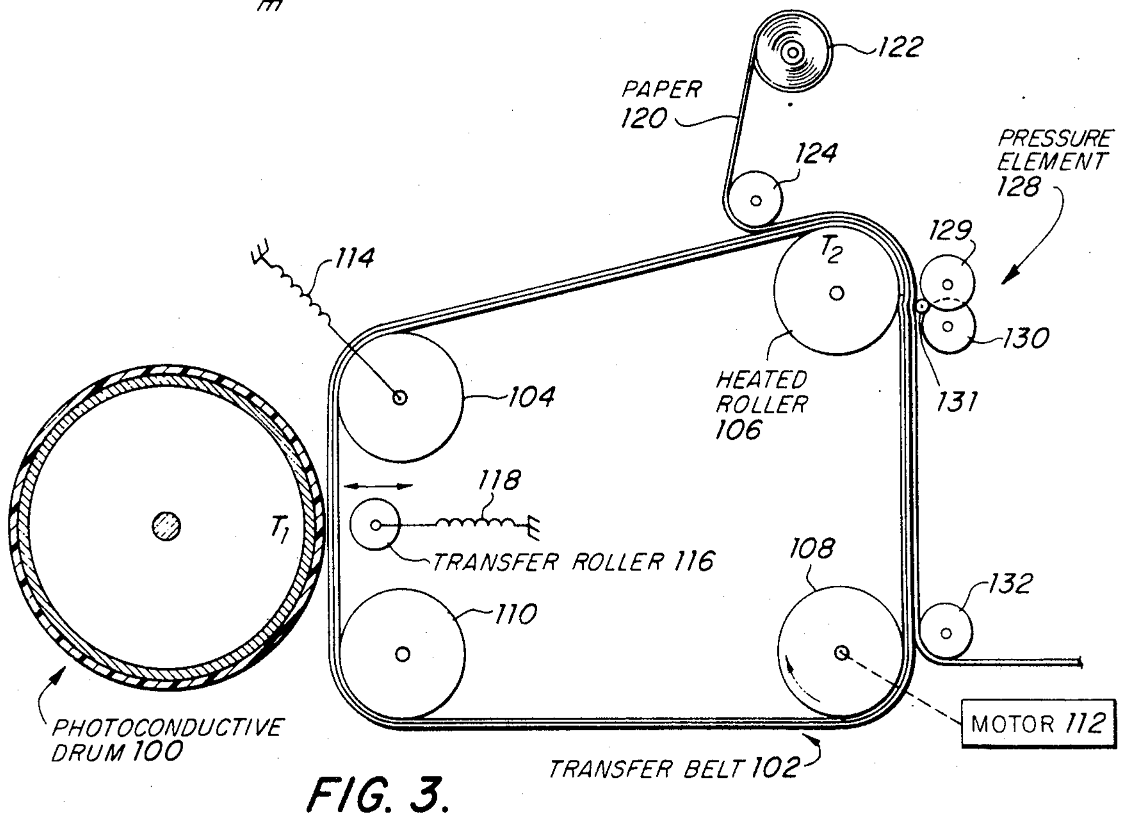
FIG. 3 is a schematic illustration of a transfer-fusing apparatus of this invention employing an intermediate transfer belt and a slidably engagable transfer roller behind the belt at the photoconductive surface.

Referring now to FIG. 3, a toner transfer and fusing apparatus is illustrated schematically using an intermediate transfer belt of the type illustrated in FIG. 1.

Photoconductive drum 100 is shown without the other imaging developing and cleaning elements which are the same as or equivalent to those previously described. Intermediate transfer belt 102 is trained to pass in an endless loop around rollers 104, 106, 108 and 110. The belt can be driven, for example, by motor 112 which drives roller 108 in a clockwise direction. Roller 104 can be adjusted by tensioning spring 114 to take up any slack created in intermediate transfer belt 102 caused by any dimensional changes due to variations in temperature thereof during, prior or subsequent to the copying process. Roller 110 is preferably constructed of hard rubber which is electrically leaky so that any background electric charges built up on belt 102, such as triboelectric charges built up between rollers and the belt, will dissipate naturally before the belt contacts photoconductor drum 100.

Transfer at $T_1$, i.e., from the surface of photoconductive insulating drum 100 to the intermediate transfer member 102, is controlled by transfer roller 116 which is positioned at the back side of transfer belt 102 so that it can be moved in and out by adjusting tensioning spring 118. Thus, transfer roller 118 moves belt 102 into or out of contact with the photoconductive drum 100 at $T_1$, and also regulates the pressure as $T_1$. This provides a method for regulating the amount of toner transferred at $T_1$ without changing the surface characteristics of belt member 102. Pressure roller 116 can be formed from a relatively soft or a relatively hard material, but for the most flexibility it is preferably formed from a material having intermediate hardness.

Paper 120 is fed from paper roll 122 and brought into contact with the toner image on belt 102 at $T_2$. Guide roller 124 directs the paper to pressure transfer assembly 128 consisting of large, interlocked rollers 128 and 130 and small roller 131 which rests on the larger rollers.

Roller 106 is a heated roller and serves to heat the toner image by supplying heat to belt 102 which in turn heats the toner image. Roller 106 can be constructed of a good heat conductor, such as aluminum, and can be heated by a resistance heater at its core.

After transfer at $T_2$, paper 120 remains in contact with belt 102 for a time sufficient to provide cooling of the belt. Paper 120 is then directed by guide roller 132 away from the transfer-fusing apparatus.

Figure 4:
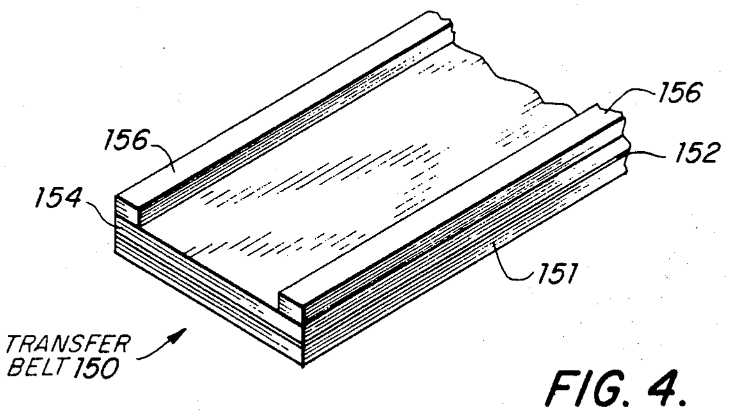
FIG. 4 is a partially cut-away perspective view of a section of an intermediate transfer belt useful with this invention.

FIG. 4 illustrates an intermediate transfer belt suitable for use with this invention. It should be understood, of course, that such a member could be shaped in the form of a drum or other shape.

Intermediate transfer belt 150 is formed from substrate materials which must meet certain stringent physical requirements. Since most commonly used electrophotographic toners melt at about 90° – 130° C., these materials must exhibit good mechanical properties at the operating temperatures, which can reach about 175° C. For example, material having an ultimate tensile strength of at least about 5000 psi and a creep of below about 3% under a load of 1000 psi at 175° C. is suitable. Suitable materials additionally should not exhibit significant distortion at such temperatures due to internal stress relief. It is also preferred that the substrate be flexible and have a low heat capacity.

One material which meets the above-mentioned stringent requirements is polyimide, which can be obtained in film form of suitable thicknesses from E. I. du Pont de Nemours and Co. under the trademark KAPTON. Other high temperature polymers believed to have suitable mechanical properties include polyarylsulfones, polyamideimide, high temperature nylons, certain aromatic copolyesters such as produced by Carborundum under the trade name Ekkcel.

Metals such as stainless steel can also provide suitable substrates providing they can be formed into thin sheets or films having the required properties at elevated temperatures. Typically metals have relatively higher specific heats than polymer films, and accordingly, thinner sheets are used to keep the total heat capacity of the belt within the desired range. Thus, a 0.5 mil stainless steel substrate might be used instead of a 2 mil polyimide film.

The substrate is made reflective by applying a suitable coating 152 thereon. Thin aluminum or gold coatings are suitable, as well as others. This reflecting layer combined with a transparent transfer material provide the capability to selectively heat toner on the surface of the transfer member.

Intermediate transfer material 154 is integrally bound to substrate 151. Transfer material 154, as might be expected, has certain critical physical characteristics. Among these are a surface free energy of 40 dynes per centimeter or lower, a hardness ranging from about 3 to 70 durometers, preferably 10–30 durometers (Shore A), and a surface which is smooth. Suitable materials include conductive and non-conductive silicone rubbers and fluoroelastomers. The exact surface properties, of course, will depend upon the transfer objectives and other design parameters.

Belt 150 is shown with conductive edges 156, which are optional but preferable. Conductive edges 156 insure that any buildup of background electrostatic charges, triboelectrically or otherwise, can be dissipated by connecting the edges 156 to ground. This can be achieved by using grounded conductive rollers which contact conductive edges 156, or by other alternative means. Typical thicknesses for suitable belts such as illustrated in FIG. 4 include substrates of about 0.5–5 mils coated with silicone rubber from about 0.1 to 10 mils, and preferably about 0.5–2 mils. The reflecting layer is very thin, typically about 300 A.

The intermediate transfer members are designed to provide exceptional thermal efficiency in the transfer and fusing steps, as well as throughout the entire copying process. Thus, materials, thicknesses, etc. are chosen to provide the member with a low heat capacity. This is achieved by keeping each of the layers as thin as is consistent with other parameters such as strength, and by using low specific heat materials. Preferred belts have total heat capacities, i.e. including all layers, of below about $3.1 \times 10^{-3}$ calories/cm²/° C.

Heat absorption in the substrate is eliminated or substantially diminished by coating it with the thin reflecting layer. The transfer surface can be made transparent to visible and infrared radiation by using silicone rubbers such as General Electric 615 or Dow Corning 3140; alternatively it can be made diffusely reflecting by using materials such as GE's RTV No. 11 silicone rubber, or Emerson and Cummings Nos. 4850 and 4451 silicone rubbers, these materials containing pigments or fillers such as silicone dioxide or titanium dioxide.

In regard to the transfer and fusion at $T_2$, i.e., from the intermediate transfer member to the final support material, there are several parameters involved in the transfer and fusing steps. The controlling parameters include the time and width of contact, force applied, surface free energy and hardness of the transfer material, the temperature of the toner and the toner's temperature-viscosity relationship. Thickness of the transfer material can also be important. Forces of between about 2 and 40 lbs. per linear inch have been found to be effective.

Fusion results from forcing heated toner to flow into the copy paper to an appreciable depth and allowing it to cool and set therein. It has been found that outstanding fusion can be achieved using the apparatus described herein. This is believed to be due to the fact that the heated toner is physically driven into the paper before it can substantially cool, thereby allowing toner to adhere, upon cooling, to the paper substrate to a considerable depth, rather than merely to the surface fibers.

The controlling parameters with heat and pressure fusion as described herein include the temperature to which the toner is heated, the pressure which is applied, the rise time of the pressure pulse, the time of application of the pressure, and the length of the transfer zone. Theoretically, the ideal situation is obtained by applying high pressures with steep rise times to toners heated to temperatures at which their viscosity is substantially lowered so that they flow easily under the applied pressure into the paper. Of course, certain tradeoffs can be made. Thus, for example, very high pressures with fast rise times and toner heated to a minimum temperature could be used to achieve very low amounts of power. However, there are limits on the amount of pressure which can be applied since excessive amounts deform copy paper causing it to curl and resulting in paper jams; also a good amount of mechanical stability is desirable in these machines and cannot be obtained if very large pressures are used.

Operating within the above general guidelines, it has been found that the toner should be preheated to a temperature sufficient to cause it to flow or to be driven into the copy paper to an appreciable depth under practical forces which can be applied. Preferably, the toner is heated to a temperature at about it melting point or higher. For purposes of this description, the toner melting point is that temperature at which the toner has a viscosity of $14\times10^6$ centipoises.

In a like manner, the pressure applied should be sufficient to cause the heated toner to flow into the paper to an appreciable depth. When the toner is heated to a temperature around its melting point, it has been found that forces of about 10 to about 20 lbs. per linear inch applied to the pressure elements described herein result in excellent fusion. Additionally, the pressure pulse should rise to a value of at least about 150 lbs. per square inch in 10 milliseconds under these conditions, and preferably about 200 lbs. per square inch in 5 milliseconds for reasons of thermal efficiency.

Figure 5:
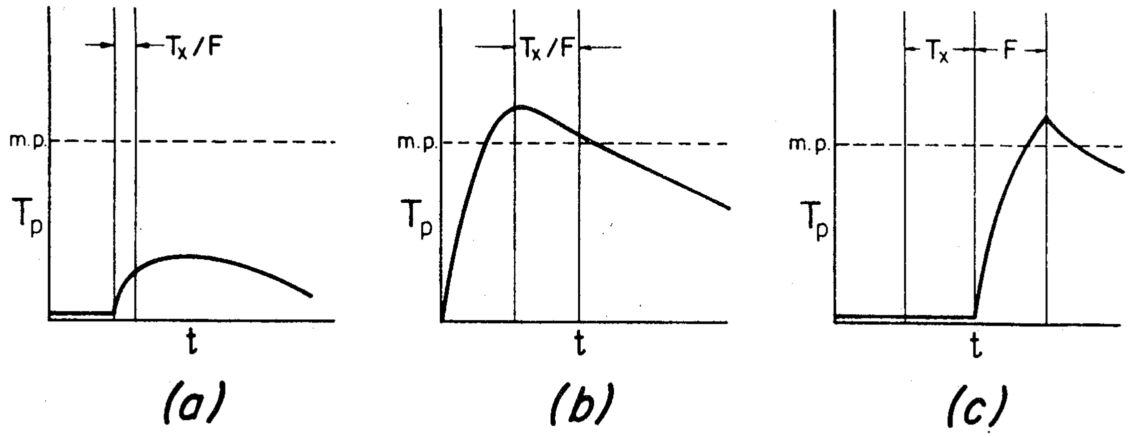
FIG. 5 presents representative plots of the heat transfer to and from copy paper, expressed as the temperature of the paper ($T_p$) versus time ($t$), in the different zones of apparatus of this invention and of the prior art.

FIG. 5 is a graphic representation of heat transferred to and from copy paper (Tp) as a function of time ($t$) in various toner transfer techniques. In FIG. 5($a$), a toner transfer technique of this invention is represented; FIG. 5($b$) represents a toner transfer technique as described in Byrne U.S. Pat. No. 3,391,276; and FIG. 5($c$) represents a transfer and fusing technique wherein toner is electrostatically transferred to the copy paper and subsequently heat-fused as is done in many prior art methods. In In FIG. 5($a$), it can be seen that the temperature of the paper does not rise appreciably prior to the transfer zone. In the transfer zone, which is narrow, the paper temperature rises sharply, but never approaches the toner melting point. After toner transfer, the paper heats up slightly prior to its exit from the machine which helps to cool the belt. While FIG. 5($a$) represents a case with no preheating of the paper, even where the paper is preheated, however, it never is heated to the toner melting point and it still exits from the machine at a relatively low temperature.

In contrast, it can be seen in FIG. 5($b$)that in the Byrne preheating technique, the paper is heated prior to the transfer zone, which is wider, to a temperature above the melting point of the toner. Since the paper is heated to such a high value initially, it cools to a much lesser extent prior to exiting from the copy machine.

In FIG. 5($c$), it can be seen that the paper is not heated prior to electrostatic transfer of toner. After transfer, the paper passes through a fusing zone during which the paper and toner are heated to a high temperature above the toner melting point so that the toner fuses to the paper.

Figure 6:
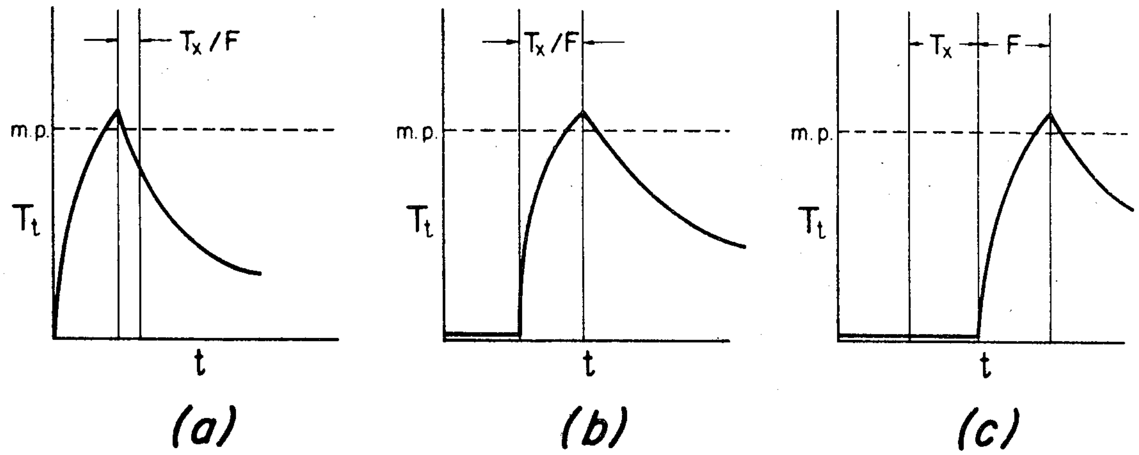
FIG. 6 presents representative plots of the heat transfer to and from a toner image, expressed as the temperature of the toner ($T_t$) versus time ($t$), in different zones of apparatus of this invention and of the prior art.

FIG. 6 is a plot of heat transfer to and from toner expressed in terms of the toner temperature ($T_t$) versus time ($t$) in the different zones of a transfer and fusing aparatus of this invention, the Byrne preheating technique, and in a customary electrostatic transfer and heat fusing apparatus. In FIG. 6($a$), it can be seen that the toner is heated to at least its melting point prior to the transfer zone. In the transfer zone, the toner cools below its melting point during transfer and fusion. Further toner cooling occurs in the cooling zone.

In contrast, FIG. 6($b$) illustrates that the Byrne transfer and fusing technique starts with temperature of the toner at ambient temperature prior to the transfer zone. In the transfer zone, heat is transferred from the preheated paper to the toner in sufficient quantities to heat the toner up to at least its melting point. Subsequent to transfer, the toner cools and fuses to the paper.

In FIG. 6($c$), it can be seen that electrostatic transfer does not result in the toner temperature being raised appreciably through the transfer zone. In the fusing zone, the temperature of the toner is elevated to at least its melting point, and subsequently the toner cools down prior to exiting from the machine.

Figure 7:
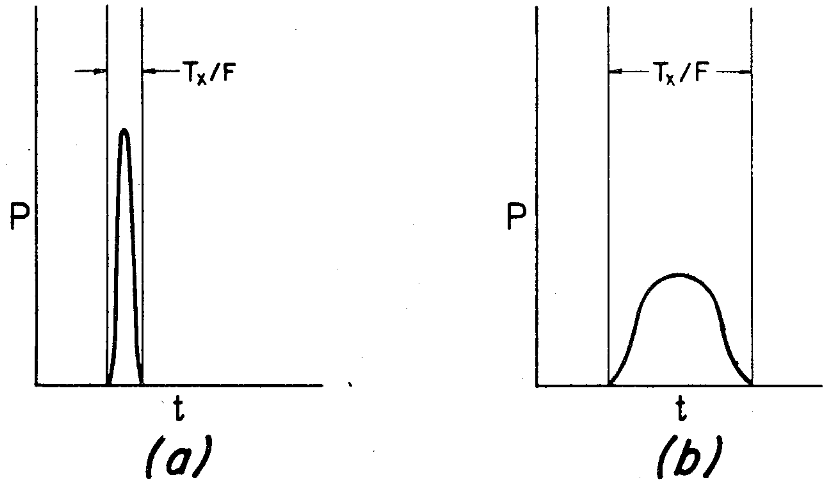
FIG. 7 presents representative plots of pressure-time pulses of this and prior art transfer and fusing apparatus.

FIG. 7 illustrates in a graphical manner the type of pressure pulse found to be preferred with this invention in the second transfer operation, and that usually found in pressure transfer operations of the prior art, such as that described in the above-mentioned Byrne patent. In FIG. 7($a$), it can be seen that the pressure applying elements described herein produce a pressure pulse with a fast rise time and a fast decline. Thus, a pulse which is high and narrow results. As explained above, it has been found desirable to utilize this type of pressure transfer to mechanically drive the heated toner into the copy paper prior to its being able to cool substantially. In this manner, outstanding fusion is obtained.

On the other hand, FIG. 7($b$) illustrates a pressure pulse such as have been previously used. Since the force is applied over relatively wide contact areas, the pulse is shorter and wider as illustrated. This type of pressure application is necessary in techniques where contact between paper and toner is relied upon to heat the toner above its melting point so that fusion will result.

Experimental runs have been made using toner transfer and fusing apparatus similar to that illustrated in FIG. 1. Typical values under equilibrium conditions are as follows. A toner image formed with Sun Chemical toner (m.p. 132° C.) is fed to an intermediate transfer belt from sheets of zinc oxide paper. The transfer belt consists of an aluminized Kapton substrate 0.002 inches thick coated with a 0.001 inch thick layer of Dow Corning 3140 silicone rubber. The transferred toner image is selectively preheated above its melting point by quartz-tungsten lamps supplied by a 1000 watt power source. The lamps are surrounded by a heat reflector. Plain, cold copy paper, 8 ½ inches wide, is fed from a roll at a speed of 15 inches per second and brought into contact with the transfer belt at a point close to the exit of the radiant heater by a pressure bar having an edge of 0.075 inches and extending across the width of copy paper. A 200 lb. force is applied on the bar. In these experiments, excellent transfer and fusion is accomplished.

There are many equivalents to the embodiments specifically described herein which fall within the scope of applicants' invention and the following claims. One example relates to the type of heater used. Whereas radiant heaters have been specifically illustrated, it will be recognized by those skilled in the art that microwave heaters could be used, because most of the transfer member materials have low dielectric loss tangents. If used, microwave heaters should have cavities designed to concentrate the microwave field. Also, it would be preferable to use toners having higher than normal amounts of carbon black with microwave heaters, such as the 65% polystyrene, 35% carbon black toner described at col. 7, lines 33–35 of Donnelly et al., U.S. Pat. No. 3,669,707. Other equivalents will be known or easily determined by no more than routine experimentation by those skilled in the art.

What is claimed is:

1. An intermediate toner transfer member comprising a substrate formed from the group consisting of a polyimide, a polyarylsulfone, a polyamideimide, and a high temperature nylon having an ultimate tensile strength of at least about 5,000 psi and a creep of below about 3% under a load of 1,000 psi at 175° C. and having thereon a smooth surface layer formed from a fluoroelastomer or a silicon rubber having a surface free energy of below about 40 dynes per centimeter and a hardness of from about 3 to about 70 durometers, said substrate having a thickness of between about 0.5 and about 5 mils and said surface layer having a thickness of from about 0.1 to about 10 mils.

2. An intermediate transfer member of claim 1 wherein the surface layer comprises a fluoroelastomer.

3. An intermediate transfer member of claim 1 wherein the surface layer comprises a silicone rubber.

4. An intermediate transfer member of claim 3 wherein said silicone rubber has a thickness of from about 0.5 to about 2 mils.

5. An intermediate transfer member of claim 4 wherein said layer of silicone rubber is coated upon a substrate comprising a polyimide film having a thickness of from about 0.5 to about 5 mils.

6. An intermediate transfer member of claim 5 wherein said silicone rubber is transparent and wherein said member contains a reflecting layer positioned between said silicone rubber layer and said polyimide substrate.

7. A multi-layered belt suitable for use in transferring and fusing toner images to a support medium, said belt comprising:

a. a polyimide substrate having a thickness of from about 0.5 to about 5 mils;

b. a smooth layer of transparent silicone rubber having a thickness of from about 0.5 to about 10 mils, said silicone rubber also having a surface free energy of below about 40 dynes per centimeter and a Shore A hardness of from about 3 to about 70 durometers; and, c. a relatively thin reflecting layer positioned between said polyimide substrate and said layer of silicone rubber.

* * * * *